(12) United States Patent
Lee et al.

(10) Patent No.: US 8,659,715 B2
(45) Date of Patent: Feb. 25, 2014

(54) LIQUID CRYSTAL DISPLAY APPARATUS

(75) Inventors: Ju-taek Lee, Suwon-si (KR);
Dae-hyoun Byoun, Seoul (KR);
Seung-eon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 488 days.

(21) Appl. No.: 12/622,758

(22) Filed: Nov. 20, 2009

(65) Prior Publication Data
US 2010/0253871 A1    Oct. 7, 2010

(30) Foreign Application Priority Data
Apr. 7, 2009   (KR) .................. 10-2009-0029962

(51) Int. Cl.
*G02F 1/1333* (2006.01)
*G02F 1/1335* (2006.01)
*F21V 7/04* (2006.01)

(52) U.S. Cl.
USPC ............... 349/58; 349/70; 362/631; 362/634

(58) Field of Classification Search
USPC ............... 349/58, 61, 65, 70; 362/631–634
See application file for complete search history.

(56) References Cited

U.S. PATENT DOCUMENTS

| | | | |
|---|---|---|---|
| 7,153,144 B2 | 12/2006 | Ohsawa et al. | |
| 2003/0086255 A1* | 5/2003 | Moon et al. | 362/97 |
| 2005/0176288 A1 | 8/2005 | Ohsawa et al. | |
| 2006/0203142 A1* | 9/2006 | Kim | 349/58 |
| 2007/0230169 A1* | 10/2007 | Kwon et al. | 362/217 |
| 2008/0024068 A1* | 1/2008 | Cho et al. | 315/161 |
| 2008/0079862 A1 | 4/2008 | Lee | |
| 2009/0201666 A1 | 8/2009 | Takata et al. | |

FOREIGN PATENT DOCUMENTS

| | | |
|---|---|---|
| EP | 1883138 A2 | 1/2008 |
| JP | 2004-213918 A | 7/2004 |
| JP | 2005-222876 A | 8/2005 |
| KR | 10-2008-0054555 A | 6/2008 |
| WO | 2008/001563 A1 | 3/2008 |

OTHER PUBLICATIONS

Extended European Search Report issued on May 27, 2010 in counterpart European Application No. 10151047.7.

* cited by examiner

*Primary Examiner* — Jessica M Merlin
(74) *Attorney, Agent, or Firm* — Sughrue Mion, PLLC (57) ABSTRACT

A liquid crystal display (LCD) apparatus is provided. The LCD apparatus includes a frame, a liquid crystal panel which is disposed inside the frame, at least one fluorescent lamp which is disposed inside the frame to project light toward the liquid crystal panel, a voltage supply printed circuit board (PCB) which supplies a driving voltage to the fluorescent lamp and includes a connection end and at least one connection terminal arranged on the connection end; and at least one fluorescent lamp connector to which the fluorescent lamp and the voltage supply PCB are connected and which includes a PCB insertion recess into which the connection end is inserted, and the PCB insertion recess has opposite sides which are open in a width direction of the fluorescent lamp connector.

14 Claims, 7 Drawing Sheets

FIG. 7 ns which are vertically located and face each other to be inserted into the same locking hole simultaneously.

Each pair of upper locking protrusion and lower locking protrusion may be formed opposite edges of the PCB insertion recess.

The upper locking protrusion and the lower locking protrusion may be formed at an entrance of the PCB insertion recess, and the locking hole may be formed on an inner edge of the connection end of the voltage supply PCB.

The fluorescent lamp connector may be made of an elastic material so that the locking protrusion is elastically connected with the locking hole.

The voltage supply PCB may be located outside the frame in parallel to the frame.

The fluorescent lamp connector may include a PCB connection part which is located outside the frame and has the PCB insertion recess, and a fluorescent lamp connection part which is located inside the frame and is connected with a connection pin of the fluorescent lamp.

The voltage supply PCB may be an IP board or an inverter board.

LIQUID CRYSTAL DISPLAY APPARATUS

CROSS-REFERENCE TO RELATED APPLICATIONS

This application claims priority from Korean Patent Application No. 10-2009-0029962, filed Apr. 7, 2009, in the Korean Intellectual Property Office, the disclosure of which is incorporated herein by reference in its entirety.

BACKGROUND

1. Field

Apparatuses and methods consistent with the inventive concept relate to a liquid crystal display (LCD) apparatus, and more particularly, a LCD apparatus which includes a fluorescent lamp connector (socket) to which a printed circuit board (PCB) is connected.

2. Description of the Related Art

In general, an LCD apparatus refers to an image display apparatus which realizes an image by passing light through a liquid crystal panel having a liquid crystal layer.

The LCD apparatus may include a fluorescent lamp for generating light, and a voltage supply PCB, such as an inverter board or an integrated power board (IP board), to supply an alternating current (AC) voltage to the fluorescent lamp. The fluorescent lamp and the voltage supply PCB are electrically connected to each other via a fluorescent lamp connector.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

According to an aspect of one or more exemplary embodiments, there is provided an LCD apparatus including a voltage supply PCB which is manufactured by a reduced number of manufacturing processes and has improved durability against external shock or vibration, and a fluorescent lamp connector to which the voltage supply PCB is connectible.

According to an aspect of exemplary embodiments, an LCD apparatus includes: a frame, a liquid crystal panel which is disposed inside the frame and has a liquid crystal layer, at least one fluorescent lamp which is disposed inside the frame to project light toward the liquid crystal panel, a PCB which supplies a driving voltage to the fluorescent lamp and has a connection end where at least one connection terminal is arranged, and at least one fluorescent lamp connector to which the fluorescent lamp and the voltage supply PCB are connected and which has a PCB insertion recess into which a part of the connection end is inserted, wherein the PCB insertion recess has opposite sides which are open in a width direction of the fluorescent lamp connector.

A leading end of the connection end of the voltage supply PCB may be a straight line.

At least one locking protrusion may be formed on the PCB insertion recess of the fluorescent lamp connector, and at least one locking hole may be formed on the connection end of the voltage supply PCB to be connected with the locking protrusion.

The locking protrusion may include at least one pair of upper locking protrusion and lower locking protrusions

BRIEF DESCRIPTION OF THE DRAWINGS

The above and other aspects will be more apparent by describing certain exemplary embodiments with reference to the accompanying drawings, in which.

DETAILED DESCRIPTION OF EXEMPLARY EMBODIMENTS

Certain exemplary embodiments are described in greater detail with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
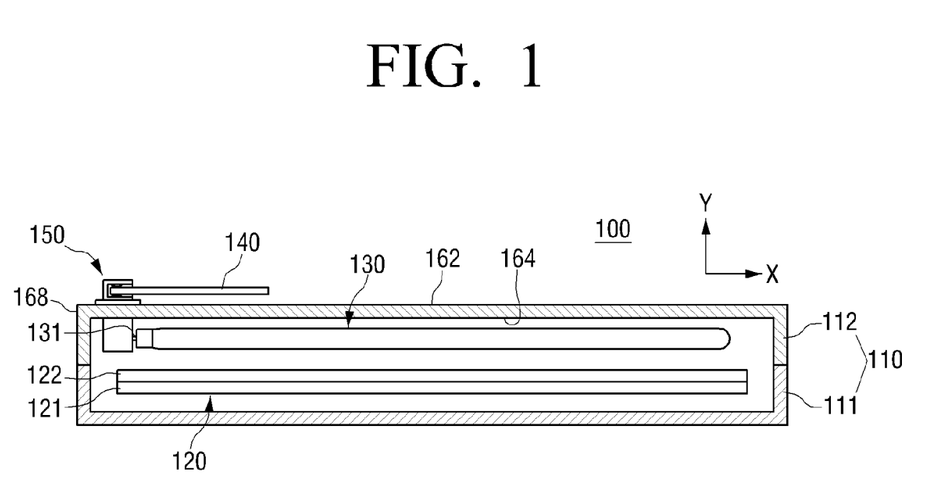
FIG. 1 is a schematic view illustrating an LCD apparatus according to an exemplary embodiment.
Figure 2:
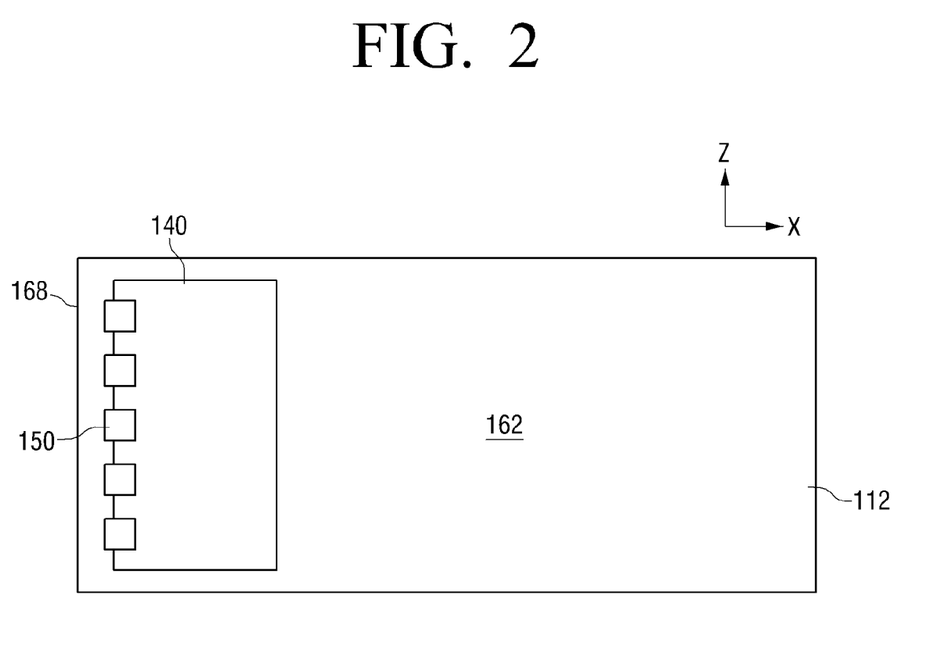
FIG. 2 is a schematic plane view illustrating the LCD apparatus.

FIG. 1 is a schematic view illustrating an LCD apparatus according to an exemplary embodiment. FIG. 2 is a schematic plane view of the LCD apparatus of FIG. 1.

Referring to FIGS. 1 and 2, an LCD apparatus 100 according to an exemplary embodiment includes a frame 110 having a front frame 111 and a rear frame 112, a liquid crystal panel 120 and a fluorescent lamp 130 which are disposed inside the frame 110, a voltage supply PCB 140 which is disposed at the outer surface 162 of the rear frame 112, and a fluorescent lamp connector 150 which is disposed on the rear frame 112.

The frame 110 is provided to accommodate and protect the plurality of components of the LCD apparatus 100 and forms a substantially rectangular parallelepiped inner space.

Although not shown in FIG. 1, in the inner space of the frame 110, optical sheets, such as a reflective sheet, a diffusion sheet, a prism sheet, and/or a protective sheet, may be selectively arranged.

The liquid crystal panel 120 is arranged substantially in parallel to the height direction Z (see FIG. 2) of the LCD apparatus 100. The liquid crystal panel 120 includes two rectangular glass plates 121, 122 which are spaced from each other by a predetermined distance by a spacer (not shown). A liquid crystal layer (not shown) having optical anisotropy is injected between the two glass plates 121, 122.

The fluorescent lamp 130 is located at the rear of the liquid crystal panel 120 toward an inner surface 164 of the rear frame 112 to project light toward the liquid crystal panel 120. The fluorescent lamp 130 may include a cold cathode fluorescent lamp (CCFL), an external electrode fluorescent lamp (EEFL), or any other appropriate light source. Although only one fluorescent lamp 130 is shown in FIG. 1, five fluorescent lamps 130 may be arranged at regular intervals in the height direction Z of the LCD apparatus 100. However, five fluorescent lamps 130 are provided as an example and the number of the fluorescent lamps 130 may be selected according to the size of the LCD apparatus 100.

The light projected from the fluorescent lamps 130 passes through the liquid crystal layer of the liquid crystal panel 120, thereby being converted into an image containing image information. The image is provided towards the front of the LCD apparatus 100.

The voltage supply PCB 140 supplies an AC voltage required to generate light to the fluorescent lamp 130 and is disposed at the outer surface 162 of the rear frame 112 substantially in parallel to the outer surface 162 of the rear frame 112. The voltage supply PCB 140 may include an inverter board, an IP board, or any other appropriate voltage supply PCB.

The fluorescent lamp connector 150 supports the fluorescent lamp 130 and the voltage supply PCB 140 and also electrically connects the fluorescent lamp 130 and the voltage supply PCB 140. In this exemplary embodiment, five fluorescent lamp connectors 150 are provided to correspond to the number of fluorescent lamps 130. As shown in FIG. 2, the fluorescent lamp connectors 150 are arranged at regular intervals in a substantially straight row along a side 168 of the rear frame 112 in the height direction Z of the LCD apparatus 100.

Figure 3:
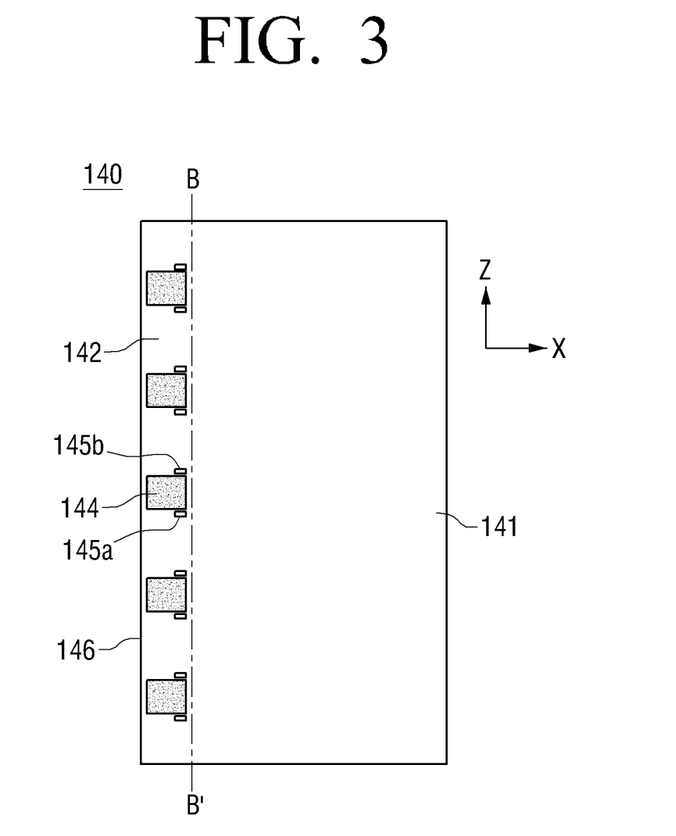
FIG. 3 is a schematic plane view illustrating a voltage supply PCB.
Figure 4:
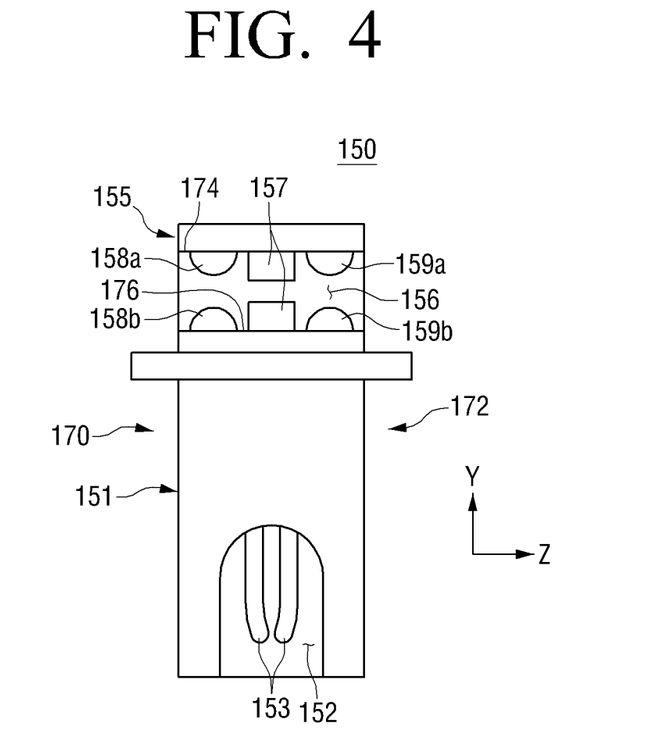
FIG. 4 is a schematic front view illustrating a fluorescent lamp connector.
Figure 5:
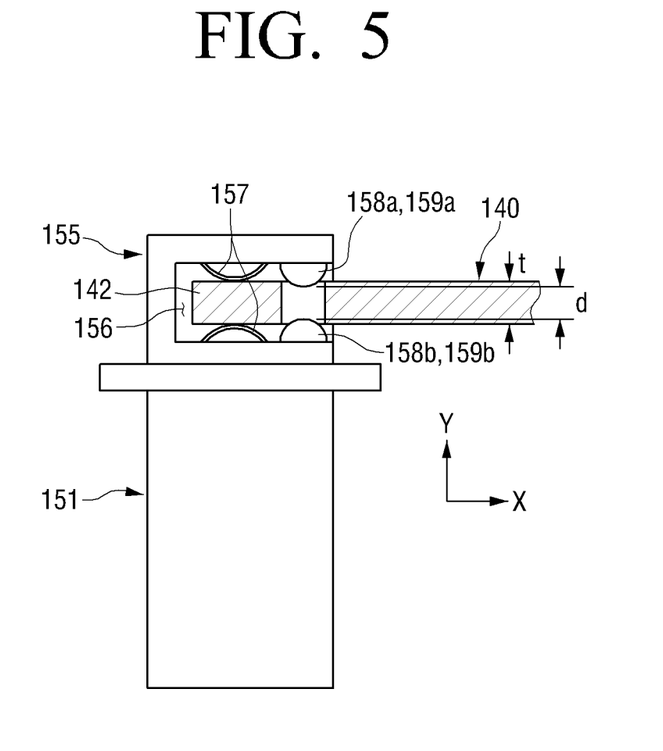
FIG. 5 is a schematic view illustrating the fluorescent lamp connector to which the voltage supply PCB is connected.

The voltage supply PCB 140 and the fluorescent lamp connector 150 are described in detail with reference to FIGS. 3 to 5. FIG. 3 is a schematic plane view of the voltage supply PCB 140 provided in the LCD apparatus 100 of FIG. 1, FIG. 4 is a schematic front view of the fluorescent lamp connector 150 provided in the LCD apparatus 100 of FIG. 1, and FIG. 5 is a schematic view of the voltage supply PCB 140 connected to the fluorescent lamp connector 150 of FIG. 4.

Referring to FIG. 3, the voltage supply PCB 140 includes a body 141 and a connection end 142. The body 141 has a substantially rectangular shape. Electric circuits, which have various functions including a function of converting a direct current (DC) voltage supplied from an external source into an AC voltage suitable for driving the fluorescent lamp 130, are patterned on the surface of the body 141.

The connection end 142 of the voltage supply PCB 140 is inserted into the fluorescent lamp connector 150 and corresponds to the left edge area of the voltage supply PCB 140 with reference to the virtual line B-B' of FIG. 3. The connection end 142 is not subjected to a routing process to form connection protrusions unlike that of a conventional voltage supply PCB. Therefore, the connection end 142 has a rectangular shape including a leading end 146 of a straight line as shown in FIG. 3. Since the routing process is not applied to form a connection protrusion on the voltage supply PCB 140, the number of manufacturing processes of the voltage supply PCB 140 is reduced and also the possibility that the connection end 142 might be broken due to the external shock or vibration is reduced.

Five connection terminals 144, corresponding to the number of the fluorescent lamps 130, are arranged at regular intervals lengthwise in a row in the lengthwise direction Z on the connection end 142. The connection terminals 144 are electrically connected to the electric circuits patterned on the body 141 and are supplied with an AC voltage which is required for the fluorescent lamp 130 to generate light.

A pair of locking openings 145a, 145b is penetratingly formed in the direction Y on the connection end 142 at opposite sides of each connection terminal 144. The locking openings 145a, 145b are configured to be connected with locking protrusions 158a, 158b, 159a, 159b formed on the fluorescent lamp connector 150. Although the locking openings 145a, 145b are of rectangular shape, as shown in FIG. 3, other shapes may be used, such as circular, oval, or polygonal.

Referring to FIG. 4, the fluorescent lamp connector 150 includes a fluorescent lamp connection part 151 and a PCB connection part 155.

The fluorescent lamp connection part 151 is located inside the frame 110 to connect to a connection pin 131 (see FIG. 1) of the fluorescent lamp 130. The fluorescent lamp connection part 151 has a fluorescent lamp insertion recess 152 formed concavely therein, and a lamp connection terminal 153 disposed in the fluorescent lamp insertion recess 152 to be connected with the connection pin 131 of the fluorescent lamp 130.

The PCB connection part 155 is located outside the frame 110 to connect to the connection end 142 of the voltage supply PCB 140. The PCB connection part 155 has a PCB insertion recess 156 having a substantially rectangular entrance. PCB connection terminals 157 extend vertically in the middle portion of the PCB insertion recess 156 to be connected with the connection terminals 144 of the connection end 142 of the voltage supply PCB 140. The PCB connection terminals 157 are electrically connected with the lamp connection terminal 153 and are brought into contact with each connection terminal 144 formed on the connection end 142 of the voltage supply PCB 140 when the voltage supply PCB 140 is inserted into the PCB insertion recess 156. The AC voltage applied to the connection terminals 144 of the voltage supply PCB 140 may be applied to the fluorescent lamp 130 through the PCB connection terminals 157 and the lamp connection terminal 153.

The PCB insertion recess 156 has opposite sides which are open in the direction Z perpendicular to the direction in which the connection end 142 of the voltage supply PCB 140 is inserted. In other words, the opposite sides of the PCB insertion recess 156 are open in a width direction of the fluorescent lamp connector 150. The width of the fluorescent lamp connector 150 refers to a distance between a first side 170 and a second side 172 of the fluorescent lamp connector 150 when the fluorescent lamp connector 150 is viewed from the front, as shown in FIG. 4. That is, the width direction of the fluorescent lamp connector 150 refers to a horizontal width in the direction Z when the fluorescent lamp connector 150 is viewed from the front, as shown in FIG. 4. The PCB insertion recess 156 is formed to have opposite sides open in the width direction of the fluorescent lamp connector 150, so that the connection end 142 of the voltage supply PCB 140 can be inserted into the PCB insertion recess 156 without requiring a connection protrusion as in a conventional voltage supply PCB.

First and second pairs of locking protrusions 158a and 158b, 159a and 159b each protrudes from edges of inner walls 174, 176 of the PCB insertion recess 156. The first pair of upper and lower locking protrusions 158a, 158b, which are arranged proximate the first side 170 facing each other, are simultaneously inserted into one locking opening 145a formed on the voltage supply PCB 140. Likewise, the second pair of upper and lower locking protrusions 159a, 159b, which are arranged proximate the second side 172 facing each other, are simultaneously inserted into other locking opening 145b formed on the voltage supply PCB 140. Although the locking protrusions 158a, 158b; 159a, 159b are shown of a hemisphere shape in FIG. 4, various other shapes may be used, such as a cone, a triangular pyramid, or a hexahedron.

As shown in FIG. 5, a distance d between the upper locking protrusions 158a, 159a and the lower locking protrusions 158b, 159b is smaller than the thickness t of the voltage supply PCB 140. The PCB connection part 155, where the locking protrusions 158a, 158b; 159a, 159b are formed, is made of an elastic material in whole or in part, such that the connection end 142 of the voltage supply PCB 140 passes between the upper locking protrusions 158a, 159a and the lower protrusions 158b, 159b when the voltage supply PCB 140 is inserted into the fluorescent lamp connector 150.

The locking protrusions 158a, 158b; 159a, 159b formed in the fluorescent lamp connector 150 are inserted into the locking openings 145a, 145b of the voltage supply PCB 140 so that the voltage supply PCB 140 is secured in position without moving in the direction X or Z with respect to the fluorescent lamp connector 150. Therefore, it is possible to prevent arc or malfunction of the fluorescent lamp 130 which may be caused by a poor contact between the connection terminal 144 of the voltage supply PCB 140 and the PCB connection terminal 157 of the fluorescent lamp connector 150.

Figure 6:
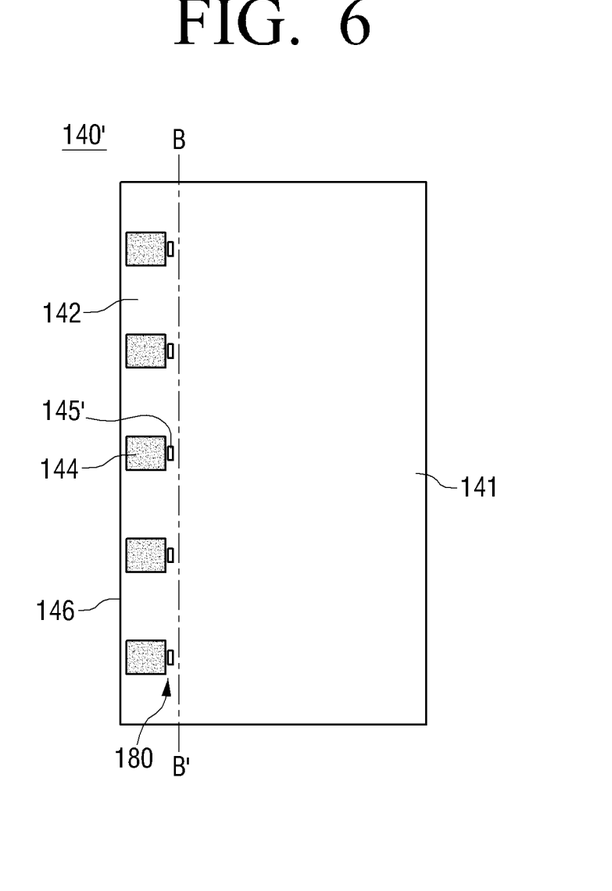
FIG. 6 is a schematic plane view illustrating a voltage supply PCB according to an exemplary embodiment.
Figure 7:
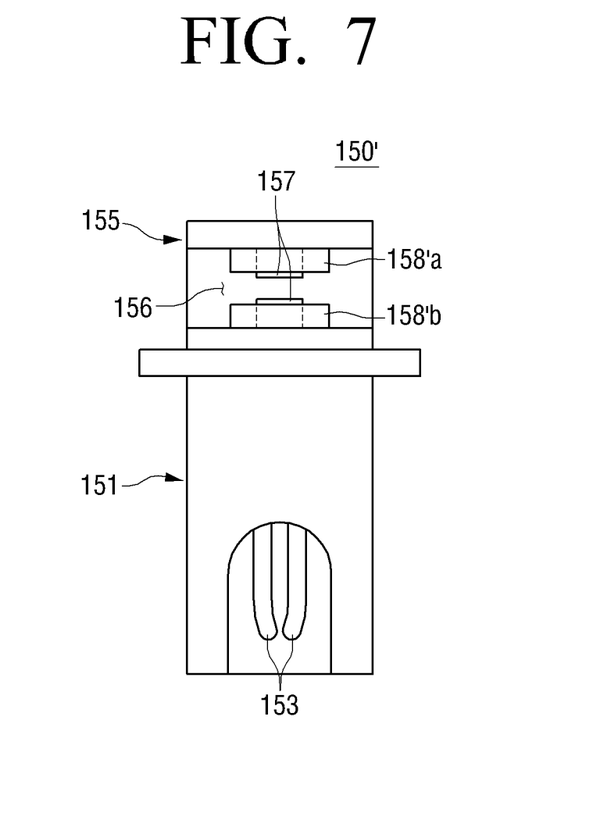
FIG. 7 is a schematic front view illustrating a fluorescent lamp connector according to an exemplary embodiment.

Referring to FIGS. 6 and 7, locking openings and locking protrusions according to an exemplary embodiment are described. FIG. 6 is a schematic plane view illustrating a voltage supply PCB according to an exemplary embodiment, and FIG. 7 is a schematic front view illustrating a fluorescent lamp connector according to an exemplary embodiment. The elements described above with reference to exemplary embodiments of FIGS. 1 to 5 are omitted. The same reference numerals are used for the like components.

As shown in FIG. 6, a single locking opening 145' is penetratingly formed on an inner edge area 180 of the connection end 142 of a voltage supply PCB 140' at the rear of a connection terminal 144. As shown in FIG. 7, one pair of upper and lower locking protrusions 158'a, 158'b is vertically formed at the entrance of the PCB insertion recess 156 of a fluorescent lamp connector 150'.

The pair of upper and the lower locking protrusions 158'a, 158'b is vertically inserted into the locking opening 145' which is formed on the connection end 142 of the voltage supply PCB 140'. When the voltage supply PCB 140' is inserted into the fluorescent lamp connector 150', the voltage supply PCB 140' is locked into the fluorescent lamp connector 150' as the locking protrusions 158'a, 158'b are press-fitted in the locking opening 145'.

As described above, the LCD apparatus 100 includes the fluorescent lamp connector 150, 150' having the PCB insertion recess 156 with open opposite sides, so that the connection end 142 of the voltage supply PCB 140, 140' may be inserted into the fluorescent lamp connector 150, 150'. The connection end 142 is not subjected to the conventional routing process to form a connection protrusion and is of a rectangular shape having a straight line leading end 146. Therefore, the number of manufacturing steps for fabrication the voltage supply PCB 140, 140' and the possibility that the connection end 142 of the voltage supply PCB 140, 140' is broken by the external shock or vibration may be reduced.

In the LCD apparatus 100 according to exemplary embodiments, at least one pair of locking protrusions 158a and 158b, 159a and 159b, 158'a and 158'b is formed in the PCB insertion recess 156 of the fluorescent lamp connector 150, 150', and locking openings 145a, 145b, 145' are formed on the connection end 142 of the voltage supply PCB 140, 140'. Because the locking protrusions 158a and 158b, 159a and 159b, 158'a and 158'b are press-fitted into the locking openings 145a, 145b, 145', the voltage supply PCB 140, 140' is fixed in position when inserted into the fluorescent lamp connector 150, 150'. Accordingly, arc or malfunction of the fluorescent lamp 130, which may occur due to a poor contact between the connection terminals 144 of the voltage supply PCB 140, 140' and the PCB connection terminals 157 of the fluorescent lamp connector 150, 150' may be prevented.

The foregoing exemplary embodiments and advantages are merely exemplary and are not to be construed as limiting the inventive concepts. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A liquid crystal display (LCD) apparatus comprising:
a frame;
a liquid crystal panel which is disposed inside the frame;
at least one fluorescent lamp which is disposed inside the frame and projects light toward the liquid crystal panel;
a voltage supply printed circuit board (PCB) which supplies a driving voltage to the fluorescent lamp and comprises a connection end and at least one connection terminal arranged at the connection end; and
at least one fluorescent lamp connector to which the fluorescent lamp and the voltage supply PCB are connected and which comprises a PCB insertion recess into which the connection end is inserted,
wherein the PCB insertion recess has opposite sides which are open in a width direction of the fluorescent lamp connector, and
wherein the connection end of the voltage supply PCB which is inserted onto the fluorescent lamp connector is a straight leading end that is entirely straight,
wherein the fluorescent lamp connector further comprises at least one locking protrusion formed in the PCB insertion recess, and the voltage supply PCB comprises at least one matching locking opening formed on the connection end to be connected with a locking protrusion,
wherein the locking protrusion comprises at least one pair of an upper locking protrusion and a lower locking protrusion which face each other and are inserted into the same matching locking opening.

2. The LCD apparatus as claimed in claim 1, wherein the pair of the upper locking protrusion and the lower locking protrusion extend from opposite sides of the PCB insertion recess toward one another.

3. The LCD apparatus as claimed in claim 1, wherein the upper locking protrusion and the lower locking protrusion are formed at an entrance of the PCB insertion recess, and the matching locking opening is formed on an inner edge of the connection end of the voltage supply PCB.

4. The LCD apparatus as claimed in claim 1, wherein the fluorescent lamp connector is made of an elastic material so that the locking protrusion is elastically connected with the matching locking opening.

5. The LCD apparatus as claimed in claim 1, wherein the voltage supply PCB is disposed outside the frame substantially parallel to the frame.

6. The LCD apparatus as claimed in claim 5, wherein the fluorescent lamp connector further comprises a PCB connection part which is disposed outside the frame and includes the PCB insertion recess, and a fluorescent lamp connection part which is disposed inside the frame and is connected with a connection pin of the fluorescent lamp.

7. The LCD apparatus as claimed in claim 1, wherein the voltage supply PCB comprises one of an integrated power board (IP board) or an inverter board.

8. A liquid crystal display (LCD) apparatus comprising:
a frame comprising a first portion and a second portion;
a liquid crystal panel disposed inside the first portion;
fluorescent lamps which are disposed inside the second portion and project light toward the liquid crystal panel;
a voltage supply printed circuit board (PCB), which is disposed outside the frame proximate the second portion and supplies a driving voltage to the fluorescent lamps, the voltage supply PCB comprising:
a connection end having a straight leading end that is entirely straight, and
connection terminals corresponding to a number of the fluorescent lamps arranged at the connection end; and
lamp connectors disposed at a rear of the second portion and coupled to fluorescent lamps, wherein each lamp connector comprises an insertion recess having opposite sides open in a width direction of the lamp connector and the straight leading end of the connection end is inserted into the open sides to connect the fluorescent lamps to corresponding connection terminals,
wherein the voltage supply PCB comprises a matching locking opening disposed on the section end of the voltage supply PCB, and the PCB insertion recess comprises two locking protrusions extending toward one another in a lengthwise direction of the lamp connector with a defined gap between one another, and are inserted into the same matching locking opening to secure the voltage supply PCB to the lamp connector.

9. The LCD apparatus as claimed in claim 8, wherein the second portion comprises a first surface disposed substantially parallel to the liquid crystal panel and facing outside of the frame and a second surface opposing the first surface and facing inside of the frame and each lamp connector is inserted through the first and second surfaces in the lengthwise direction to electrically connect each fluorescent lamp with the corresponding connection terminal.

10. The LCD apparatus as claimed in claim 8, wherein the voltage supply PCB comprises one of an integrated power board and an inverter board.

11. A liquid crystal display (LCD) apparatus comprising:
a frame;
a liquid crystal panel which is disposed inside the frame;
at least one light source which is disposed inside the frame and projects light toward the liquid crystal panel;
a voltage supply printed circuit board (PCB) which supplies a driving voltage to the light source and comprises a connection end and at least one connection terminal arranged at the connection end; and
at least one light source connector to which the light source and the voltage supply PCB are connected and which comprises a PCB insertion recess into which the connection end is inserted,
wherein the PCB insertion recess has opposite sides which are open in a width direction of the light source connector, and
wherein the connection end of the voltage supply PCB which is inserted into the light source connector is a straight leading end that is entirely straight,
wherein the light source connector further comprises at least one locking protrusion formed in the PCB insertion recess, and the voltage supply PCB comprises at least one matching locking opening formed on the connection end to be connected with the locking protrusion,
wherein the locking protrusion comprises at least one pair of an upper locking protrusion and a lower locking protrusion which face each other and are inserted into the same matching locking opening.

12. The LCD apparatus as claimed in claim 11, wherein the light source is a fluorescent lamp.

13. The LCD apparatus as claimed in claim 11, wherein the voltage supply PCB is disposed outside the frame substantially parallel to the frame.

14. The LCD apparatus as claimed in claim 13, wherein the light source connector further comprises a PCB connection part which is disposed outside the frame and includes the PCB insertion recess, and a light source connection part which is disposed inside the frame and is connected with a connection pin of the light source.

* * * * *